(12) United States Patent
Corley et al.

(10) Patent No.: US 8,635,328 B2
(45) Date of Patent: Jan. 21, 2014

(54) DETERMINING TIME VARYING THRESHOLDS FOR MONITORED METRICS

(75) Inventors: Carole Rhoads Corley, Austin, TX (US); Mark Wallace Johnson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 3371 days.

(21) Appl. No.: 10/286,611

(22) Filed: Oct. 31, 2002

(65) Prior Publication Data

US 2004/0088406 A1    May 6, 2004

(51) Int. Cl.
*G06F 15/173* (2006.01)

(52) U.S. Cl.
USPC .......................................................... 709/224

(58) Field of Classification Search
USPC .......................................................... 709/224
See application file for complete search history.

(56) References Cited

U.S. PATENT DOCUMENTS

| | | | |
|---|---|---|---|
| 3,971,987 A | 7/1976 | Carrubba et al. | 325/38 B |
| 4,034,340 A | 7/1977 | Sant'Agostino | 340/146.1 |
| 5,229,767 A | 7/1993 | Winter et al. | 341/50 |
| 5,446,733 A | 8/1995 | Tsuruoka | 370/60.1 |
| 5,627,886 A | 5/1997 | Bowman | 379/111 |
| 5,796,633 A | 8/1998 | Burgess et al. | 364/551.01 |
| 5,796,757 A | 8/1998 | Czaja | 371/46 |
| 5,815,670 A | 9/1998 | Iverson et al. | 395/200.77 |
| 5,865,026 A | 2/1999 | Davey et al. | 60/274 |
| 5,905,957 A * | 5/1999 | Olds | 455/435.1 |
| 5,963,457 A | 10/1999 | Kanoi et al. | 364/528.26 |
| 6,061,609 A | 5/2000 | Kanoi et al. | 700/291 |
| 6,122,664 A | 9/2000 | Boukobza et al. | 709/224 |
| 6,144,379 A | 11/2000 | Bertram et al. | 345/348 |
| 2003/0149570 A1 * | 8/2003 | Qiu | 705/1 |

FOREIGN PATENT DOCUMENTS

JP    6164616 A    7/1994    .............. G06F 11/16

OTHER PUBLICATIONS

Baker et al., "Time Series Modeling of Reactive Ion Etching Using Neural Networks," IEEE Transactions on Semiconductor Manufacturing, 8(1):62-71, Feb. 1995.
Connor et al., "Recurrent Neural Networks and Robust Time Series Prediction," IEEE Transaction on Neural Networks, 5(2):240-254, Mar. 1994.
Hellerstein et al., "Characterizing Normal Operation of a Web Server: Application to Workload Forecasting and Problem Detection," Proceedings of the 1998 Computer Measuring Group Conference (CMG '98), 1:150-160, 1998.

(Continued)

*Primary Examiner* — Christopher Biagini
(74) *Attorney, Agent, or Firm* — Yee & Associates, P.C.; Jeffrey S. LaBaw

(57) ABSTRACT

A method and apparatus for determining time-varying thresholds for measured metrics are provided. With the method and apparatus, values of a given metric are captured over time. The behavior of the metric is analyzed to determine its seasonality. Correlated historical values of the metric and additional related metrics (cross-correlation) are used as inputs to a feed-forward back propagation neural network, in order to train the network to generalize the behavior of the metric. From this generalized behavior, point-by-point threshold values are calculated. The metric is monitored and the monitored values are compared with the threshold values to determine if the metric has violated its normal time-varying behavior. If so, an event is generated to notify an administrator of the error condition.

27 Claims, 4 Drawing Sheets

(56) References Cited

OTHER PUBLICATIONS

Ho et al., "Real-Time Performance Monitoring and Anomaly Detection in the Internet: An Adaptive, Objective-Driven, Mix-and-Match Approach," Bell Labs Technical Journal, 4(4):23-41, Oct./Dec. 1999.

Hood et al., "Proactive Network Fault Detection," INFOCOM '97, 16th Annual Joint Conference of the IEEE Computer and Communications Societies. Driving the Information Revolution, Proceedings of the IEEE, 3:1147-1155, Apr. 1997.

Nielsen et al., "Some Tools for Identification of Nonlinear Time Series," Technical Report, Department of Mathematical Modelling, Technical University of Denmark, Lyngby, Denmark, Oct. 1998, 28 pages.

* cited by examiner

DETERMINING TIME VARYING THRESHOLDS FOR MONITORED METRICS

BACKGROUND OF THE INVENTION

1. Technical Field

The present invention is directed to a method and apparatus for determining time varying thresholds for monitored metrics. In particular, the present invention is directed to a method and apparatus in which a neural network is used to predict values of metrics and thresholds for the metrics at various times are determined based on the predicted value of the metric at that time.

2. Description of Related Art

Monitoring computer system or network metrics is a complex task, particularly if metrics have significant time-varying behavior. Time varying-behavior makes the configuration of appropriate threshold values for metrics difficult. That is, because the behavior of the computing system or network changes from time to time, the use of the same threshold for determining improper operation of the system for all time periods will lead to reporting of false errors.

The most common approach to alleviating this problem is to use multiple fixed threshold values, each hand-configured to be valid for some period of time deemed significant by an administrator. When a metric's monitored value violates a threshold, an event is typically generated to notify administrators of an error condition.

While this approach is simple and widely used, it has significant drawbacks. The logic required to ignore all but the most important threshold violation is complicated, often resulting in multiple events reaching event consoles. This forces administrators to learn to ignore certain events in the presence of other events. The knowledge required to configure thresholds is also significant and a trial-and-error approach is often utilized.

Thus, it would be beneficial to have an apparatus and method for automatically determining thresholds for measured metrics in a time-varying manner. Further, it would be beneficial to have an apparatus and method for determining thresholds in a manner that reflects the seasonality of the metrics and their time-varying characteristics.

SUMMARY OF THE INVENTION

The present invention provides a method and apparatus for determining time-varying thresholds for measured metrics. With the method and apparatus of the present invention, values of a given metric are captured over time. The behavior of the metric is analyzed to determine its seasonality. Correlated historical values of the metric and additional related metrics (cross-correlation) are used as inputs to a feed-forward back propagation neural network, in order to train the network to generalize the behavior of the metric. From this generalized behavior, point-by-point threshold values are calculated. The metric is monitored and the monitored values are compared with the threshold values to determine if the metric has violated its normal time-varying behavior. If so, an event is generated to notify an administrator of the error condition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
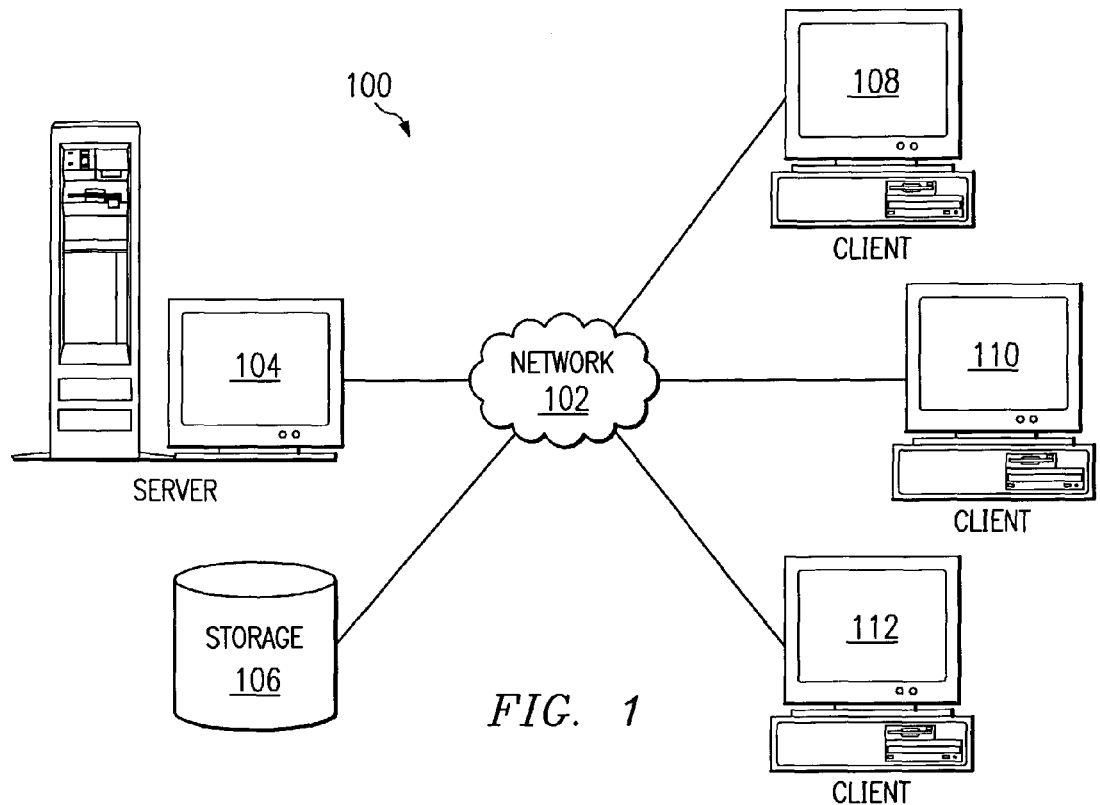
FIG. 1 is an exemplary block diagram of a distributed data processing environment in which the present invention may be implemented.
Figure 2:
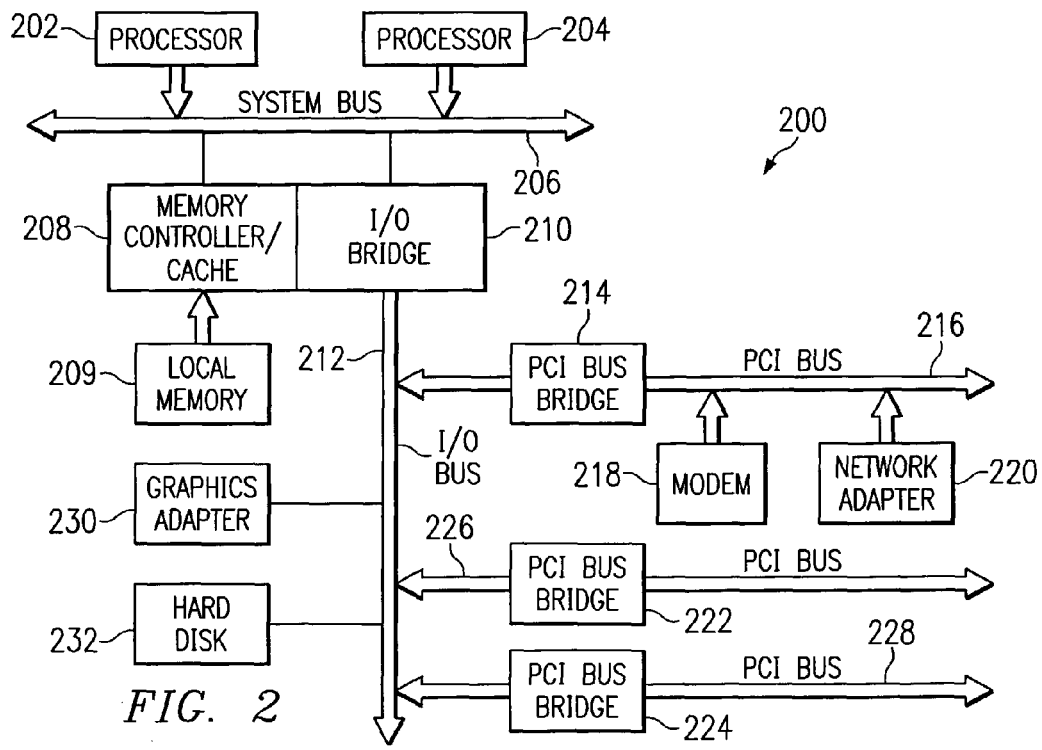
FIG. 2 is an exemplary block diagram of a server computing device in accordance with the present invention.
Figure 3:
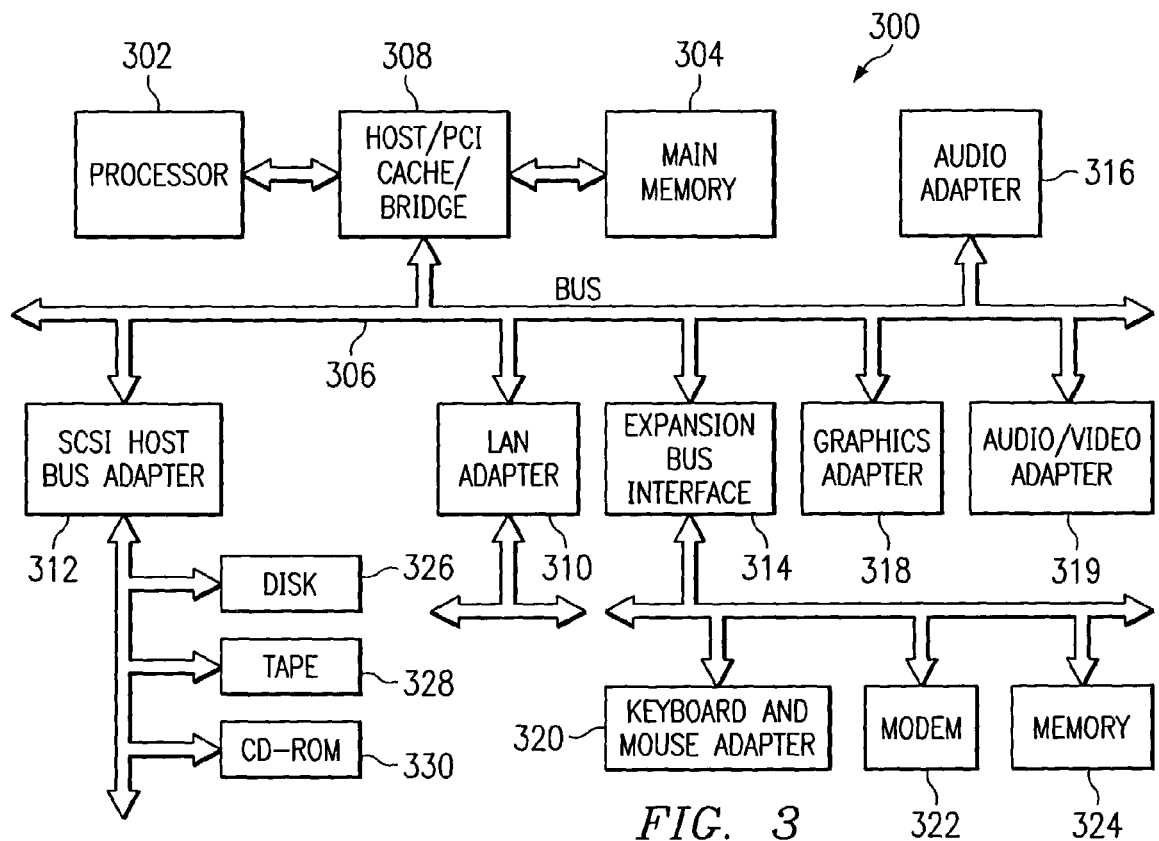
FIG. 3 is an exemplary block diagram of a client computing device in accordance with the present invention.

The present invention may be used to generate time-varying thresholds for the monitoring of operational characteristics of computing systems and networks. Thus, the present invention may be implemented in a stand-alone computing device or in a distributed computing environment. Therefore, the following descriptions of FIGS. 1-3 are intended to provide an overview of some exemplary computing environments in which the present invention may be implemented. FIG. 1 illustrates a distributed computing environment in which servers and clients are utilized and in which measured metrics, such as packets per second, HyperText Transport Protocol (HTTP) requests per second, server utilization, and the like may be monitored.

FIG. 2 illustrates a server in which the present invention may be implemented in such a distributed computing environment. FIG. 3 illustrates a client or stand-alone computing device in which the present invention may be implemented. In a stand-alone computing device, the present invention may be used to monitor such metrics as CPU utilization, transaction load metrics, and the like.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As previously stated above, the present invention provides a method and apparatus for determining time-varying thresholds for a measured metric. The method and apparatus of the present invention generates one or more threshold values for every monitored system metric value, effectively generating sets of continuous time-varying thresholds. The thresholds are determined based on predicted metric values at specific time points. Thus, rather than using a generalized threshold that is determined through a trial and error approach, the present invention predicts what the metric value will be at a particular point in time, determines a threshold value based on this prediction, measures the actual metric value at that time, and compares the measured value to the threshold value to determine if an event should be generated for notifying an administrator of a potential error condition.

In order to generate a continuous set of time-varying thresholds in accordance with the present invention, a number of operations are performed. First, the values for a metric are collected over time using a data collection facility. Example data collection facilities that may be used to collect data regarding a particular metric include, for example, Tivoli's Distributed Monitoring, Simple Network Management Protocol (SNMP) or Windows Management Instrumentation (WMI).

SNMP is a widely used network monitoring and control protocol in which data is passed from SNMP agents, which are hardware and/or software processes reporting activity in each network device (hub, router, bridge, etc.) to the workstation console used to oversee the network. The agents return information contained in a Management Information Base (MIB), which is a data structure that defines what is obtainable from the device and what can be controlled (turned off, on, etc.).

WMI is a programming interface (API) in the Windows operating systems that allows system and network devices to be configured and managed. WMI uses a subset of SQL called the "WMI Query Language" (WQL) to access managed objects through VBScripts or Microsoft Management Console (MMC) snap-ins.

Examples of metrics for which data may be collected using the data collection facilities include HTTP requests per second, CPU utilization, server utilization, packets per second or other metrics that could vary with time and have seasonal behaviors. The collection of metric values over a period of time represents a time series for the metric.

Once the data is collected over a period of time, the metric's time series is analyzed to detect any seasonality of the metric, i.e. periodically repeating behavior of the metric over time. Many metrics exhibit some level of seasonality, or similar behavior during certain periods. For example, the behavior of a metric on a Monday may be similar to its behavior on previous Mondays. This is an example of a day-of the-week seasonality classification. Another common classification of seasonal behavior is weekdays, weekends and holidays, meaning the metric's behavior on one weekday is very similar to its behavior on another weekday, but different from its behavior on weekends and holidays.

The seasonality of a metric's time series may be determined either manually or automatically. Manually, the seasonality may be determined by plotting the time series of values for the metric and identifying patterns in the plotted values. Automatically, various statistical mechanisms may be employed for determining the seasonality including, for example, determining if the average value of a metric for a particular time period is similar to the average value of the metric for other time periods. Other possible ways of analyzing the time series of metric values statistically to determine seasonality may be used without departing from the spirit and scope of the present invention. For example, another mechanism for determining seasonality is to identify a set of likely seasonality parameters (24 hours in a day, 168 hours in a week, 7 days in a week, etc.). The data within each of these seasonality periods is then analyzed to determine which periods produce the strongest correlation. These periods may then be identified as the seasonality of the data.

Once the seasonality of the metric is determined, autocorrelation and cross-correlation with other metric values is performed. With auto-correlation, lagged values, i.e. history values or values for the metric preceding a value that is to be predicted, that are most strongly correlated to the metric value to be predicted are selected as inputs to be used with a neural network for predicting metric values.

For example, if it is determined that the metric values on Thursdays are almost always 50% of the metric values on Wednesdays, the metric values for Thursdays may be selected for input to the neural network. This serves to strengthen the accuracy of the prediction of the neural network since there is an established correlation between the inputs and the expected output that can be reflected in the weighting of the neural network nodes.

Sometimes other metrics may bear a relationship with the metric that is to be predicted. For example, it may be determined that server utilization bears a relationship with the processing time per transaction. As a result, by inputting values of other metrics that have a correlation with the metric that is to be predicted, a stronger and more accurate prediction may be generated. The identification of other metrics and the particular values of these other metrics that have a relationship with the metric that is to be predicted may be performed using cross-correlation.

Algorithms for linear autocorrelation and cross-correlation are well known and available from many sources. For example, autocorrelation functions that may be used with the present invention include the linear and nonlinear lag dependence functions ldf and nldf defined by Nielson et al., "Some Tools for Identification of Nonlinear Time Series," Dept. of Mathematical Modeling, Technical University of Denmark, Technical Report 1998-16, 1998, which is hereby incorporated by reference. Other autocorrelation and cross-correlation algorithms and mechanisms known in the art, or later developed, may be used without departing from the spirit and scope of the present invention.

Having identified the seasonality of the metric time series of values and the correlation of values of the metric and values of other metrics, it is necessary to select the particular inputs that will be used to train a neural network for predicting the values of the metric at future times. Neural network input selection is based on the selection of correlated inputs. The analysis of correlation results should support the analysis of seasonality results. For example, if the behavior of a metric exhibits weekly seasonality and is sampled hourly, then one would expect the 168th lagged value for the metric to be highly correlated with the value to be predicted. Auto and cross correlation analyses may yield additional inputs of importance. Thus, based on seasonality analysis and on the correlations determined from autocorrelation and cross-correlation, data values are obtained from the time series data sets for the various metrics and are stored as the training set of data for the neural network.

The training data set is input to the neural network in order to train the neural network to generate accurate predictions of values for the metric of interest at future time points. The neural network to which this training data set is input may have any of a number of different architectures. At a minimum, the neural network comprises an input layer, at least one hidden layer, and an output layer. The number of input layer nodes will typically be determined based on the results of the correlation analysis, e.g., the number of different metrics that have a relationship to the metric to be predicted. The number of hidden layers, and hidden layer nodes may be determined empirically with a minimum of two nodes. The output layer of the neural network will typically have a single output node that outputs the predicted value for the metric. However, multiple output nodes maybe used without departing from the spirit and scope of the present invention.

Using the training data set, a neural network is trained to predict the next value for the metric. Training involves inputting the data from the training data set to generate predictions and then comparing those predictions to the actual values measured. Based on the comparison, weights of the various nodes in the neural network may be adjusted to generate a more accurate prediction. Training of neural networks is generally known in the art.

Once the neural network is trained, the neural network is tested. Testing the trained neural network produces a vector of values that generalizes the metric's behavior over a new set of collected data. From this vector of predicted values for collected data, thresholds are generated. Thus, training is performed to determining the appropriate operation of the neural network to generate predicted values and the predicted values are used with actual test data to generate thresholds. Once the thresholds are determined, they may be used with actual measured data at future times to evaluate the operation of the computer system or network.

With testing of the neural network, for a particular set of inputs, a predicted value for a given metric may be output. The present invention uses this predicted value for the metric as a basis for determining a threshold value for the actual value of the metric at the particular time point in the future. This may be done to a time series of test data values thereby providing a virtually continuous time-varying set of threshold values that may be automatically determined and used to monitor the operation of a computing system or network. From the time series of predicted values generated based on the time series of test data values, point-by-point thresholds are calculated based on the standard deviation of the prediction error. One or more threshold values are calculated for each metric value. Threshold values are indexed based on their relative timestamp or index in the corresponding time series. This enables, for example, a threshold set for Mondays at 8:02 am.

The particular algorithm for generating the thresholds may take any of a number of different forms based on the particular implementation of the present invention. In a preferred embodiment, however, the formula for generating the set of threshold values is a 2 point sliding window, based on calculating the standard deviation of the residual error for each point in the set of predicted metric values. The formula takes into account the standard deviation of the residual error of the previous point. A constant value is also added to provide thresholds for areas where the prediction and the actual value are very close. The result is a threshold set that is based on the standard deviation of the residual error of the prediction. Calculated thresholds are proportionally larger when the standard deviation of the data is larger.

In mathematical form, the formula for calculating the thresholds takes the form:

$$T_t = A*(((e_t-u)^2 + (e_{t-1}-u)^2)/2)^{1/2} + B*w$$

where:
$T_t$=magnitude of the threshold at time t
A=constant
$e_t$=residual estimation error at time t
$e_{t-1}$=residual estimation error at time t−1
u=mean estimation error for the period for which thresholds are being calculated
B=constant
w=mean estimation for the period for which thresholds are being calculated The actual stored values for upper and lower thresholds may then be determined as the neural network predicted value plus or minus the threshold magnitude determined from the above formula. The initial value of the threshold is set to be equivalent to the next threshold value ($T_0 = T_1$), as it cannot be calculated given the above formula.

It should be apparent to those of ordinary skill in the art that this is only one exemplary formula for automatically determining the thresholds for a value of a metric at a future time based on a predicted value. Other formulas and methodologies may be utilized without departing from the spirit and scope of the present invention. The basic requirement, however, is that the particular formula used is based on the prediction of the metric value.

The thresholds for each predicted metric value may then be stored in a threshold data structure for later use in monitoring the operation of the computing system or network. The data structure may take many forms but, in a preferred embodiment, is a lookup table indexed by timestamp. Thus, the element monitoring the computing system or network in real-time may lookup threshold values in the lookup table based on the current timestamp and perform a comparison with those threshold values to determine if an event should be generated to notify an administrator of a potential error condition.

As system or network performance evolves over time, retraining the neural network system will generate new models. This practice effectively re-baselines the threshold system, allowing it to adapt to normal performance trends.

Thus, the present invention provides a mechanism for generating time-varying thresholds for a performance metric using a neural network-based method of generalizing the metric's behavior based on history values of the metric and related variables. Time-varying thresholds for performance metrics are highly desirable due to the inherent drawbacks of dealing with sets of constant thresholds. The use of time-varying thresholds saves the administrator time and effort and adds significant value beyond the capabilities of existing monitoring implementations.

Figure 4:
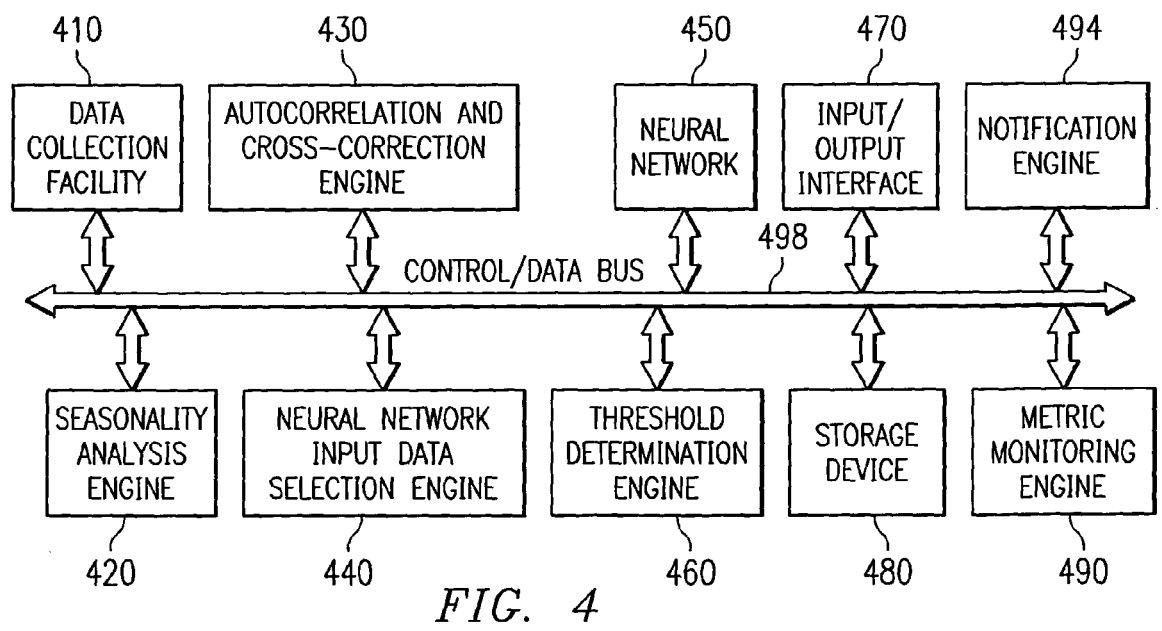
FIG. 4 is an exemplary block diagram of an apparatus for determining time varying thresholds for measured metrics in accordance with the present invention.

FIG. 4 is an exemplary block diagram of an apparatus for determining time varying thresholds for measured metrics in accordance with the present invention. The components shown in FIG. 4 may be implemented in hardware, software, or any combination of hardware and software. In a preferred embodiment, the components illustrated in FIG. 4 are implemented as software instructions executed by one or more data processing devices.

As shown in FIG. 4, the threshold determination device includes a data collection facility 410, a seasonality analysis engine 420, an autocorrelation and cross-correlation engine 430, a neural network input data selection engine 440, a neural network 450, a threshold determination engine 460, an input/output (I/O) interface 470, a storage device 480, a metric monitoring engine 490, and a notification engine 494. These elements communicate with one another via the control/data signal bus 498.

The data collection facility 410 is responsible for collecting historical data for the metrics that are monitored by the threshold determination device. The data collection facility 410 may work in conjunction with the metric monitoring engine 490 to compile one or more time series of values for various monitored metrics and store those time series in the storage device 480.

The seasonality analysis engine 420 analyzes the stored time series for a given metric to identify any seasonality in the metric values, as previously described above. Any seasonality of the time series of metric values may be noted and stored in a data structure in the storage device 480 for use in performing autocorrelation analysis.

It is important to perform the seasonality analysis prior to performing autocorrelation and cross-correlation. Autocorrelation results can be very hard to interpret and keeping the underlying periodicity, or seasonality, in mind is the key to knowing where to look for correlated lagged values. Otherwise looking for correlated lagged values can be equated to looking for a needle in a haystack.

The autocorrelation and cross-correlation engine 430 analyzes the time series of metric values for the metric of interest and other metrics to determine any correlations between lagged values and values of other metrics. These correlations are then noted and stored in the data structure in the storage device 480 for use in determining the input data for the neural network.

The neural network input data selection engine 440 reads the data structure stored in the storage device 480 to determine the seasonality and correlations of data identified by the seasonality analysis engine 420 and the autocorrelation and cross-correlation engine 430. Based on this information, data from the time series of metric values for the metric of interest and correlated metrics are selected and stored in a training data set in the storage device 480.

The training data set is then input to the neural network 450 and the neural network is trained to predict values for the metric of interest. As noted above, training of the neural network may involve adjusting weights of nodes in the neural network until a difference between the predicted value of a metric and the actual measured value of a metric is within an acceptable tolerance. The actual values of the metric may be obtained from values measured by the metric monitoring engine 490.

Once the neural network 450 is trained, the metric monitoring engine 490 may, in conjunction with the data collection facility 410, collect data regarding the operation of the computing system or network. This data may be fed into the trained neural network and the neural network outputs predicted values for the metric of interest at future times. This series of predicted values for the metric may then be stored in the storage device 480 for use by the threshold determination engine 460.

The threshold determination engine 460 reads in the predicted values for the metric from the storage device 480 and calculates at least one threshold associated with the predicted values for the metric at each time point. The set of thresholds may then be stored in a data structure, such as a lookup table indexed by timestamp, in the storage device 480.

As the metric monitoring engine 490 monitors and measures the values of the metric of interest, these values are compared against the thresholds calculated for the particular time point. That is, a lookup of the thresholds in the lookup table for a particular timestamp is performed and the resulting thresholds are compared against the measured value for the metric. If the comparison meets certain criteria, the metric monitoring engine 490 may send an instruction to the notification engine 494 instructing that an event be generated to notify the administrator of a potential error condition. Notification may be made via the input/output interface 470.

It should be appreciated that the metric values measured during the normal monitoring operations of the metric monitoring engine 490 may be used to continually generate new predictions of metric values for points in the future. Thus, while determining whether the measured metric value is within the calculated thresholds, this metric value may also be used as input to the neural network 450 to generate yet a further prediction of the metric value at another future time point.

The operation of the seasonality analysis engine 420, autocorrelation and cross-correlation engine 430, and neural network input data selection engine 440, as well as training of the neural network may be initiated on a periodic basis or in response to a request received from an administrator via the input/output interface 470, for example.

It should be appreciated that the architecture shown in FIG. 4 is only exemplary and is not intended to imply any limitation as to the particular architecture that may be used with the present invention. One of ordinary skill in the art would understand that many different modifications may be made to the architecture shown without departing from the spirit and scope of the present invention.

Figure 5:
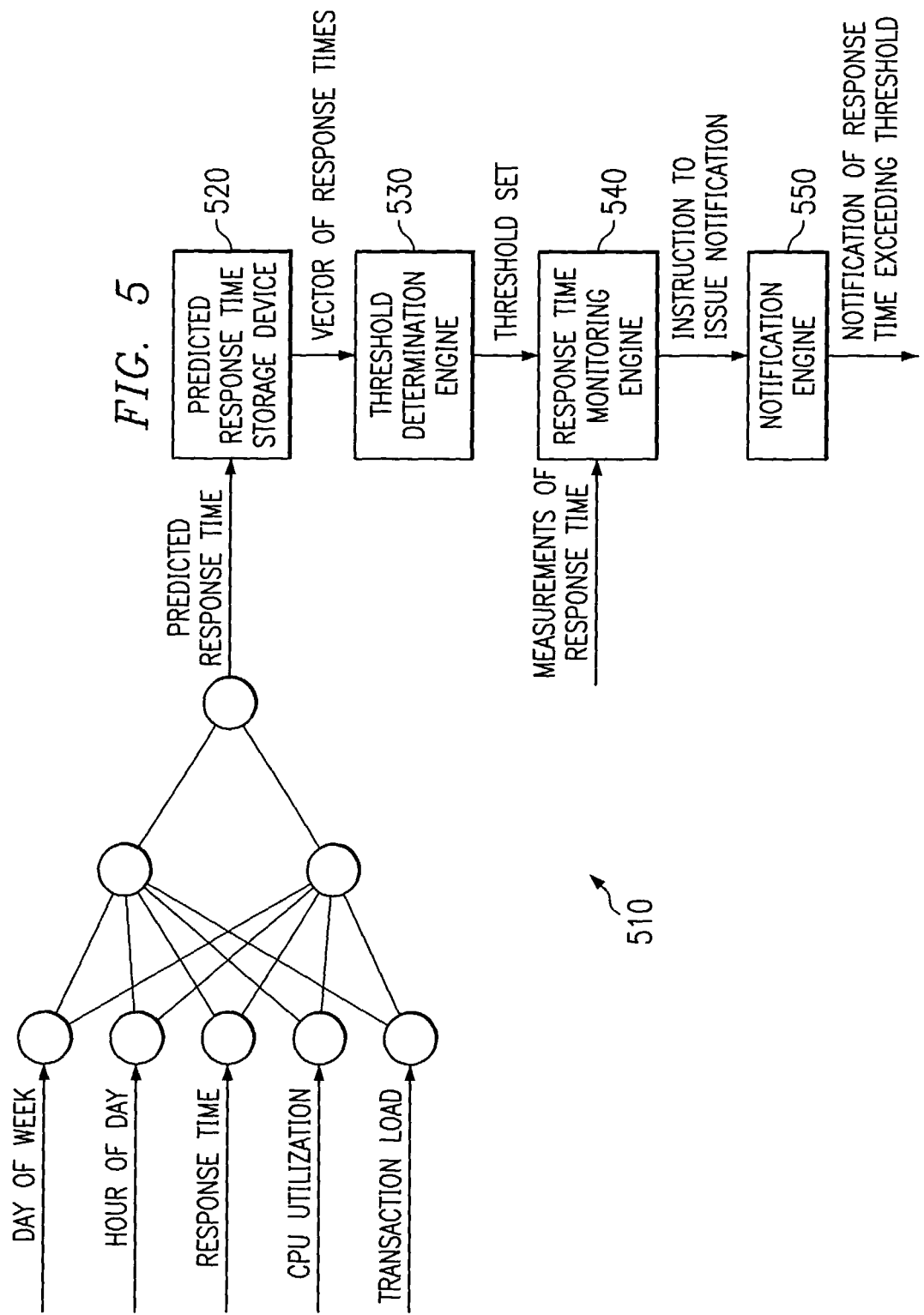
FIG. 5 is an exemplary diagram illustrating a data flow in accordance with the present invention.

FIG. 5 is an exemplary diagram illustrating a data flow in accordance with an exemplary implementation of the present invention. The example shown in FIG. 5 is the use of inputs including day of week, hour of day, response time, CPU utilization and transaction load to a neural network in order to predict a response time for a computing system at a future point. It should be appreciated that the particular inputs and outputs of the system shown in FIG. 5 are only exemplary and do not imply any limitation on the type of data that may serve as inputs or output. Rather, any metrics may be used as both inputs and outputs of the system without departing from the spirit and scope of the present invention.

As shown in FIG. 5, these inputs are provided to the neural network 510 which outputs a predicted response time. This predicted response time is stored in a predicted response time storage device 520. The result of multiple sets of inputs is a series, or vector, of response times that is output to the threshold determination engine 530.

The threshold determination engine 530 generates a threshold set based on the vector of response times and outputs this threshold set to a response time monitoring engine 540. The response time monitoring engine 540 also receives inputs of measurements of actual response times for the time points in the threshold set. The actual response times are compared to the calculated thresholds for a corresponding time point and a determination is made as to whether an instruction to issue a notification should be sent. If so, the instruction is sent to the notification engine 550 which generates an event to notify an administrator of a response time that exceeds the calculated threshold.

Figure 6:
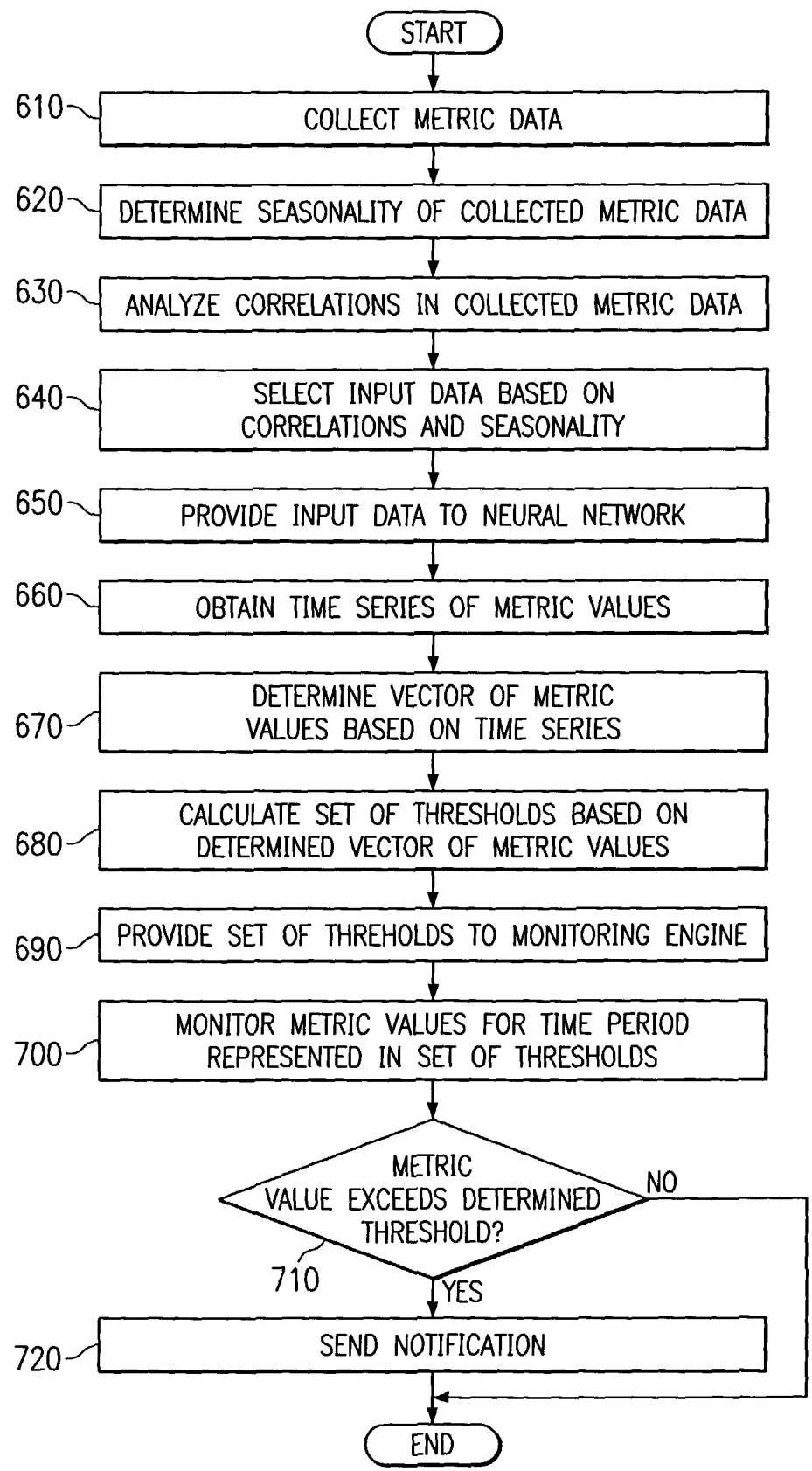
FIG. 6 is a flowchart outlining an exemplary operation of the present invention.

FIG. 6 is a flowchart outlining an exemplary operation of the present invention. As shown in FIG. 6, the operation starts with the collection of metric data (step 610). The seasonality of the collected metric data is then determined (step 620). The metric data and data for other metrics are analyzed to determine any correlations (step 630) and input data is selected based on the correlations and seasonality of the metric data (step 640).

The input data set is provided to the neural network (step 650) and a time series of predicted metric values is obtained (step 660). A vector of the predicted metric values is determined based on the time series (step 670) and a set of thresholds is calculated for the vector (step 680).

The set of thresholds is provided to a monitoring engine (step 690) which monitors the metric values for a time period represented in the set of thresholds (step 700). A determination is made as to whether any of the metric values exceeds a determined threshold (step 710). If not, the operation ends. If so, a notification is sent (step 720) and the operation ends. This operation may be repeated.

Thus, the present invention provides a method and apparatus for automatically determining time-varying thresholds for a measured metric. The present invention avoids the drawbacks of constant thresholds by determining thresholds based on predictions of what the metric value will be at particular future points in time. As a result, the thresholds are automatically adapted to the seasonal behavior of the metric.

While the present invention has been described in terms of a predicted output metric value that is independent of the other metrics yet has some correlation to the input metrics, the present invention is not limited to such. Rather, the output of the present invention may be a function of one or several of the input metrics. For example, if health $h=f(x1, x2, \ldots xn)$, where xn are input values to the neural network, the present invention may be applied to predict the value for h at a future time point. A common scenario in which this may useful is monitoring health types of a computer system or network, such as availability health or performance health.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of monitoring the performance of a computing system, comprising:
    generating a series of predictions of at least one performance parameter for a series of future time points;
    determining a time-varying threshold value based on the series of predictions of the at least one performance parameter, wherein the time-varying threshold value is adjusted from one threshold value to another in correspondence with the series of predictions of the performance parameter;
    measuring a value of the at least one performance parameter at a future time point; and
    comparing the measured value to a value of the time-varying threshold value at the future time point to determine if a potential error condition is present, wherein determining a time-varying threshold value based on the series of predictions of the at least one performance parameter includes a hardware processing component calculating a threshold magnitude based on the following formula and adding or subtracting the magnitude to or from a prediction of the at least one performance parameter:

$$Tt = A*(((et-u)2+(et-1-u)2)/2)^{1/2} + B*w$$

wherein Tt is a magnitude of a threshold at time t, A is a constant, et is a residual error at time t, et−1 is a residual error at time t−1, u is a mean error for a time period in which the threshold is being calculated, B is a constant, and w is a mean prediction value for the time period in which the threshold is being calculated.

2. A method of monitoring the performance of a computing system, comprising:
    generating a series of predictions of at least one performance parameter for a series of future time points such that a plurality of predictions are generated for each of the at least one performance parameter for each of the future time points;
    determining a series of time-varying threshold values based on the series of predictions of the at least one performance parameter, wherein the series of time-varying threshold values is adjusted from one threshold value to another in correspondence with the series of predictions of the at least one performance parameter such that a plurality of threshold values are generated for each of the at least one performance parameter for each of the future time points;
    a hardware processing component storing the series of time-varying threshold values in a lookup table indexed by timestamp;
    measuring a value of the at least one performance parameter at a future time point; and
    comparing the measured value to a value of the series of time-varying threshold values at the future time point to determine if a potential error condition is present, wherein comparing the measured value to the value of the series of time-varying threshold values includes performing a lookup of the value of the series of time-varying threshold values in the lookup table using a current timestamp.

3. A computer program product comprising instructions stored in a tangible computer readable storage device that are operable for monitoring the performance of a computing system in accordance with the method of claim 2 when executed by a processor.

4. The computer program product of claim 3, wherein generating a series of predictions of at least one performance parameter comprises:
    training a neural network to generate a prediction of the at least one performance parameter;
    providing inputs to the neural network, wherein the inputs comprise seasonality data and correlation data generated from a time series of values for the at least one performance parameter; and
    generating the series of predictions of the at least one performance parameter by the neural network based on the inputs provided to the neural network.

5. The computer program product of claim 4, wherein generating the series of predications of the at least one performance parameter further comprises:
    analyzing the time series of values for the at least one performance parameter to determine the seasonality data of the time series of values, wherein the seasonality data is determined by determining that a value of a performance parameter for a particular time period is similar to another value of the performance parameter for another time period.

6. The computer program product of claim 5, wherein generating the series of predictions of the at least one performance parameter further comprises:
    analyzing the seasonality data of the time series of values for the at least one performance parameter to determine an autocorrelation of the seasonality data; and
    determining at least some of the inputs to be provided to the neural network based on the autocorrelation of the seasonality data.

7. The computer program product of claim 4, wherein generating the series of predictions of the at least one performance parameter further comprises:
    analyzing a time series of values for at least one other performance parameter to determine a cross-correlation of the time series of values of the at least one other performance parameter with the time series of values for the at least one performance parameter; and
    determining at least some of the inputs to be provided to the neural network based on the cross-correlation.

8. The computer program product of claim 3, wherein determining a series of time-varying threshold values based on the series of predictions of the at least one performance parameter includes calculating the series of time-varying threshold values based on a standard deviation of a residual error of a prediction of the at least one performance parameter.

9. The computer program product of claim 3, wherein the instructions are further operable for:
   determining, based on results of comparing the measured value to the value of the series of time-varying threshold values, whether to send a notification to a user; and
   sending the notification to the user if it is determined that the notification should be send.

10. The computer program product of claim 3, wherein generating a series of predictions of the at least one performance parameter further comprises:
   analyzing a time series of values for the at least one performance parameter to determine a seasonality of the time series of values;
   analyzing the determined seasonality of the time series of values to determine an autocorrelation of the time series of values;
   analyzing a time series of values of at least one other performance parameter based on the determined seasonality of the time series of values to determine a cross-correlation of the time series of values of the at least one other performance parameter with the time series of values of the at least one performance parameter; and
   determining inputs to be provided to a neural network based on the autocorrelation and the cross-correlation.

11. An apparatus for monitoring the performance of a computing system, comprising a processor coupled to a memory having instructions stored therein that are executable by the processor to perform the method of claim 2.

12. The apparatus of claim 11, wherein generating a series of predictions of at least one performance parameter comprises:
   training a neural network to generate a prediction of the at least one performance parameter;
   providing inputs to the neural network, wherein the inputs comprise seasonality data and correlation data generated from a time series of values for the at least one performance parameter; and
   generating the series of predictions of the at least one performance parameter by the neural network based on the inputs provided to the neural network.

13. The apparatus of claim 12, wherein generating the series of predications of the at least one performance parameter further comprises:
   analyzing the time series of values for the at least one performance parameter to determine the seasonality data of the time series of values, wherein the seasonality data is determined by determining that a value of a performance parameter for a particular time period is similar to another value of the performance parameter for another time period.

14. The apparatus of claim 13, wherein generating the series of predictions of the at least one performance parameter further comprises:
   analyzing the seasonality data of the time series of values for the at least one performance parameter to determine an autocorrelation of the seasonality data; and
   determining at least some of the inputs to be provided to the neural network based on the autocorrelation of the seasonality data.

15. The apparatus of claim 12, wherein generating the series of predictions of the at least one performance parameter further comprises:
   analyzing a time series of values for at least one other performance parameter to determine a cross-correlation of the time series of values of the at least one other performance parameter with the time series of values for the at least one performance parameter; and
   determining at least some of the inputs to be provided to the neural network based on the cross-correlation.

16. The apparatus of claim 11, wherein determining a series of time-varying threshold values based on the series of predictions of the at least one performance parameter includes calculating the series of time-varying threshold values based on a standard deviation of a residual error of a prediction of the at least one performance parameter.

17. The apparatus of claim 11, wherein the instructions are further executable to perform steps of:
   determining, based on results of comparing the measured value to the value of the series of time-varying threshold values, whether to send a notification to a user; and
   sending the notification to the user if it is determined that the notification should be send.

18. The apparatus of claim 11, wherein generating a series of predictions of the at least one performance parameter further comprises:
   analyzing a time series of values for the at least one performance parameter to determine a seasonality of the time series of values;
   analyzing the determined seasonality of the time series of values to determine an autocorrelation of the time series of values;
   analyzing a time series of values of at least one other performance parameter based on the determined seasonality of the time series of values to determine a cross-correlation of the time series of values of the at least one other performance parameter with the time series of values of the at least one performance parameter; and
   determining inputs to be provided to a neural network based on the autocorrelation and the cross-correlation.

19. The method of claim 2, wherein generating a series of predictions of at least one performance parameter comprises:
   training a neural network to generate a prediction of the at least one performance parameter;
   providing inputs to the neural network, wherein the inputs comprise seasonality data and correlation data generated from a time series of values for the at least one performance parameter; and
   generating the series of predictions of the at least one performance parameter by the neural network based on the inputs provided to the neural network.

20. The method of claim 19, wherein generating the series of predications of the at least one performance parameter further comprises:
   analyzing the time series of values for the at least one performance parameter to determine the seasonality data of the time series of values, wherein the seasonality data is determined by determining that a value of a performance parameter for a particular time period is similar to another value of the performance parameter for another time period.

21. The method of claim 20, wherein generating the series of predictions of the at least one performance parameter further comprises:
   analyzing the seasonality data of the time series of values for the at least one performance parameter to determine an autocorrelation of the seasonality data; and
   determining at least some of the inputs to be provided to the neural network based on the autocorrelation of the seasonality data.

22. The method of claim 19, wherein generating the series of predictions of the at least one performance parameter further comprises:
   analyzing a time series of values for at least one other performance parameter to determine a cross-correlation of the time series of values of the at least one other performance parameter with the time series of values for the at least one performance parameter; and
   determining at least some of the inputs to be provided to the neural network based on the cross-correlation.

23. The method of claim 2, wherein determining a series of time-varying threshold values based on the series of predictions of the at least one performance parameter includes calculating the series of time-varying threshold values based on a standard deviation of a residual error of a prediction of the at least one performance parameter.

24. The method of claim 2, further comprising:
   determining, based on results of comparing the measured value to the value of the series of time-varying threshold values, whether to send a notification to a user; and
   sending the notification to the user if it is determined that the notification should be send.

25. The method of claim 2, wherein generating a series of predictions of the at least one performance parameter further comprises:
   analyzing a time series of values for the at least one performance parameter to determine a seasonality of the time series of values;
   analyzing the determined seasonality of the time series of values to determine an autocorrelation of the time series of values;
   analyzing a time series of values of at least one other performance parameter based on the determined seasonality of the time series of values to determine a cross-correlation of the time series of values of the at least one other performance parameter with the time series of values of the at least one performance parameter; and
   determining inputs to be provided to a neural network based on the autocorrelation and the cross-correlation.

26. A computer program product comprising instructions stored in a tangible computer readable storage device that are operable for monitoring the performance of a computing system, the instructions comprising:
   first instructions for generating a series of predictions of at least one performance parameter for a series of future time points, the first instructions including instructions for analyzing a time series of values for the at least one performance parameter to determine a seasonality of the time series of values, and instructions for determining the inputs to be provided to a neural network based on the seasonality of the time series of values;
   second instructions for determining a time-varying threshold value based on the series of predictions of the at least one performance parameter, wherein the time-varying threshold value is adjusted from one threshold value to another in correspondence with the series of predictions of the performance parameter;
   third instructions for measuring a value of the at least one performance parameter at a future time point; and
   fourth instructions for comparing the measured value to a value of the time-varying threshold value at the future time point to determine if a potential error condition is present, wherein the second instructions for determining a time-varying threshold value based on the series of predictions of the at least one performance parameter include instructions for calculating a threshold magnitude based on the following formula and adding or subtracting the magnitude to or from a prediction of the at least one performance parameter:

$$Tt = A*(((et-u)2+(et-1-u)2)/2)^{1/2}+B*w$$

wherein Tt is a magnitude of a threshold at time t, A is a constant, et is a residual error at time t, et−1 is a residual error at time t−1, u is a mean error for a time period in which the threshold is being calculated, B is a constant, and w is a mean prediction value for the time period in which the threshold is being calculated.

27. An apparatus for monitoring the performance of a computing system, comprising a processor coupled to a memory having instructions stored therein that are executable by the processor to perform steps of:
   generating a series of predictions of at least one performance parameter for a series of future time points;
   determining a time-varying threshold value based on the series of predictions of the at least one performance parameter, wherein the time-varying threshold value is adjusted from one threshold value to another in correspondence with the series of predictions of the performance parameter;
   measuring a value of the at least one performance parameter at a future time point; and
   comparing the measured value to a value of the time-varying threshold value at the future time point to determine if a potential error condition is present, wherein determining a time-varying threshold value based on the series of predictions of the at least one performance parameter includes calculating a threshold magnitude based on the following formula and adding or subtracting the magnitude to or from a prediction of the at least one performance parameter:

$$Tt = A*(((et-u)2+(et-1-u)2)/2)^{1/2}+B*w$$

wherein Tt is a magnitude of a threshold at time t, A is a constant, et is a residual error at time t, et−1 is a residual error at time t−1, u is a mean error for a time period in which the threshold is being calculated, B is a constant, and w is a mean prediction value for the time period in which the threshold is being calculated.

* * * * *